Mar. 20, 1923.
W. S. COLE
BAIL LOCK
Filed Sept. 9, 1921
1,449,267
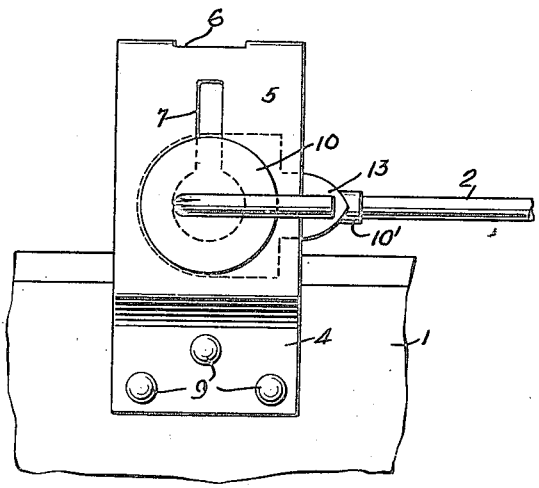
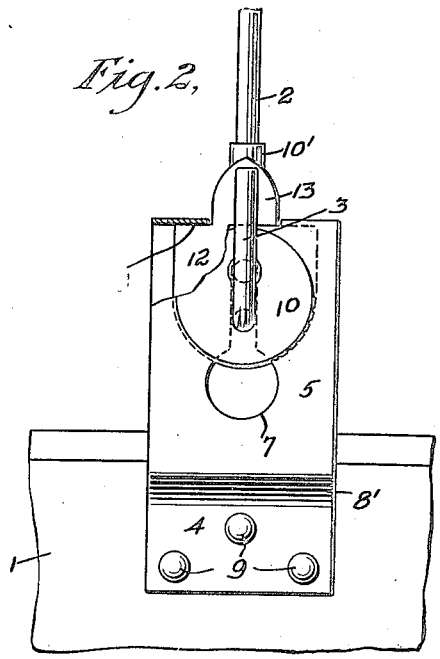
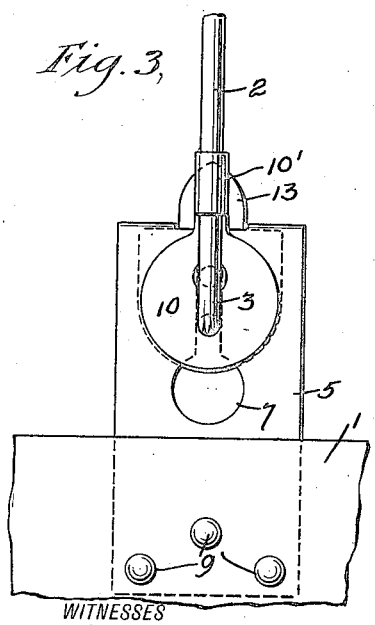
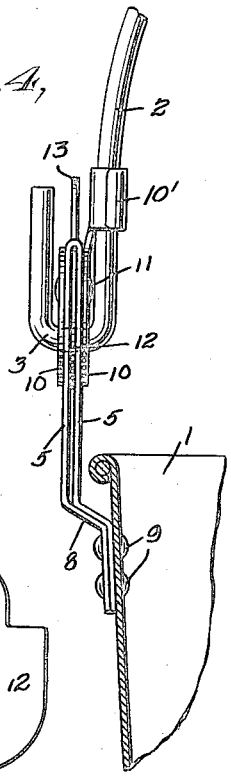
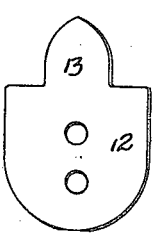
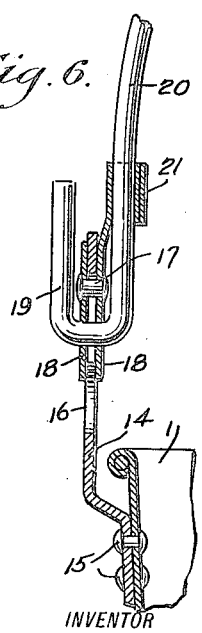
WITNESSES
Edw. Thorpe
F. J. Foster
INVENTOR
W. S. Cole
BY
Munn & Co
ATTORNEYS Patented Mar. 20, 1923.

1,449,267

UNITED STATES PATENT OFFICE.

WINFIELD S. COLE, OF JOHNSTOWN, NEW YORK.

BAIL LOCK.

Application filed September 9, 1921. Serial No. 499,466.

*To all whom it may concern:*

Be it known that I, WINFIELD S. COLE, a citizen of the United States, and a resident of Johnstown, in the county of Fulton and State of New York, have invented a new and Improved Bail Lock, of which the following is a full, clear, and exact description.

This invention relates to improvements in bail locks, the principal object of the invention being to provide means which will prevent swinging of a pail on the bail when it is being carried, and yet to provide means for permitting the bail to be swung to horizontal position when said swinging becomes desirable.

A further object is to provide a bail locking device, which may be applied to all forms of containers, which have bails associated therewith, and to provide a locking device, which will be simple and practical in construction, durable and efficient in use, and comparatively inexpensive to manufacture.

With these and other objects in view, the invention consists in certain novel features of construction and combinations and arrangements of parts as will be more fully hereinafter described and pointed out in the claims.

In the accompanying drawings:

Figure 1 is a fragmentary view of the container and bail equipped with my improved bail lock showing the bail swung to horizontal position;

Figure 2 is a similar view with parts broken away for clearness showing the bail locked in vertical position;

Figure 3 is a view similar to Figure 2, looking at the opposite side of the locking mechanism;

Figure 4 is an edge view of the locking mechanism showing the bail locked in vertical position;

Figure 5 is a plan view of the locking plate; and

Figure 6 is a view in vertical section through the locking mechanism, illustrating a slight modification.

Referring in detail to the drawings, 1 represents a vessel or container, such as an ordinary water pail, and 2 represents a conventional wire bail bent upon itself at each end to provide a substantially U-shaped hook 3. My invention resides in the provision of means for connecting the bail and the vessel in such a manner that when the vessel is supported by the bail, the bail will be locked in vertical position, and at the same time to provide means for swinging the bail to horizontal position when it is not in use.

In carrying out the invention, I provide a locking mechanism at each end of the bail, or rather at each side of the vessel. Since these mechanisms are identical, I have only shown one of them.

The reference numeral 4, designates a sheet of bendable metal folded along transverse lines to provide a pair of parallel plates 5, spaced apart. A short slot 6 is provided at the junction of the plates and the plates are also formed with registering key-hole slots 7. The ends of the sheet 4 are offset, as indicated at 8', and are rigidly secured to the vessel 1 by securing devices 9, in such a manner that the two plates 5 are rigidly supported above the top of the vessel and in spaced relationship thereto.

Flat circular plates 10 located upon opposite sides of the two plates 5 are connected by a rivet 11. A locking plate 12 interposed between the two plates 5 is also connected to the plates 10 by the same rivet. The locking plate 12 and the two circular plates 10 are formed with registering perforations, through which the hooked end 3 of the bail is passed. A tongue 13, integral with the locking plate projects through the slot 6 when the rivet 11 is in the upper narrow end of the key-hole slot 7. Shoulders 8 on the locking plate adjacent the tongue, engage the folded portion of the sheet 4 and positively prevent rotation of the bail 2, which is rigidly connected to an extension 10' on one of the plates 10.

In order to permit rotation of the bail, it is necessary to force the same downwardly until the rivet 11 is in the round end of the key-hole slot 7, as shown in Figure 1, and the tongue 13 is withdrawn from the slot 6. The bail may then be swung to horizontal position since neither the rivet 11, nor the tongue 13 are engageable with the plates 5, to prevent its swinging movement.

In Figure 6, I have illustrated a modified form of bail lock in which a single plate 14 is secured to the side of a pail, as indicated at 15. The plate has a key-hole slot 16 therein and a rivet 17, accommodated in the slot serves to connect a pair of circular plates 18, these plates having registering perforations accommodating the hooked end 19 of a bail 20. One of the plates 18 is also provided with an extension 21, wrapped around the bail 20 to prevent independent swinging movement of the bail and the plates. This locking mechanism operates on substantially the same principle as the mechanism illustrated in the preferred form, except that I rely upon the rivets 17 alone to prevent swinging of the bail.

Although I have illustrated certain of the preferred embodiments of my invention, it will be apparent that various slight changes and alterations might be made in the general form and arrangement of the parts described without departing from the invention, and hence I do not wish to limit myself to the precise details set forth, but shall consider myself at liberty to make such slight changes and alterations as fairly fall within the spirit and scope of the appended claims.

I claim:

1. In a bail lock, the combination with a receptacle and a bail, of plates secured to opposite sides of the receptacle, having key-hole slots therein, said bail including hooked ends accommodated in the slots, and means other than the hooked ends of the bail and engageable with the walls of the narrow ends of the slots preventing swinging of the bail when the weight of the receptacle is supported thereby.

2. In a bail lock, the combination with a receptacle and a bail, of plates secured to opposite sides of the receptacle, having key-hole slots therein, said bail including hooked ends accommodated in the slots, and means other than the hooked ends of the bail and engageable with the walls of the narrow ends of the slots preventing swinging of the bail when the weight of the receptacle is supported thereby, said means being rigidly connected to the bail.

3. In a bail lock, the combination with a receptacle and a bail, of plates secured to opposite sides of the receptacle, having key-hole slots therein, said bail including hooked ends accommodated in the slots, means engageable with the walls of the narrow ends of the slots preventing swinging of the bail when the weight of the receptacle is supported thereby, said means rigidly connected to the bail and including plates located on opposite sides of the slots, said plates having perforations therein receiving the hooked ends of the bail, and devices passed through the slots connecting the plates.

4. The combination with a plate having a key-hole slot therein, of a bail including a hooked end passed through the slot, plates on opposite sides of the slot perforated to receive the end of the bail, means connecting the plates, and means preventing swinging of the bail when said last mentioned means is in the narrow end of the key-hole slot.

5. In a bail lock, the combination with a vessel, of a sheet of metal bent upon itself to form a pair of parallel plates spaced apart, said sheet having a slot therein along the line of connection of the plates, the free ends of said sheet being secured to the vessel, said plates having registering key-hole slots therein, a bail including a hooked end passed through the slots, a locking plate movable between the slotted plates and rigidly connected to the bail, and means carried by said plate preventing swinging of the bail when the vessel is supported thereby.

6. In a bail lock, the combination with a vessel, of a sheet of metal bent upon itself to form a pair of parallel plates spaced apart, said sheet having a slot therein along the line of connection of the plates, the free ends of said sheet being secured to the vessel, said plates having registering key-hole slots therein, a bail including a hooked end passed through the slots, a locking plate movable between the slotted plates and rigidly connected to the bail, and means carried by said plate preventing swinging of the bail when the vessel is supported thereby, said means including a tongue on the locking plate engageable in the first mentioned slot.

WINFIELD S. COLE.